United States Patent Office 2,910,691
Patented Oct. 27, 1959

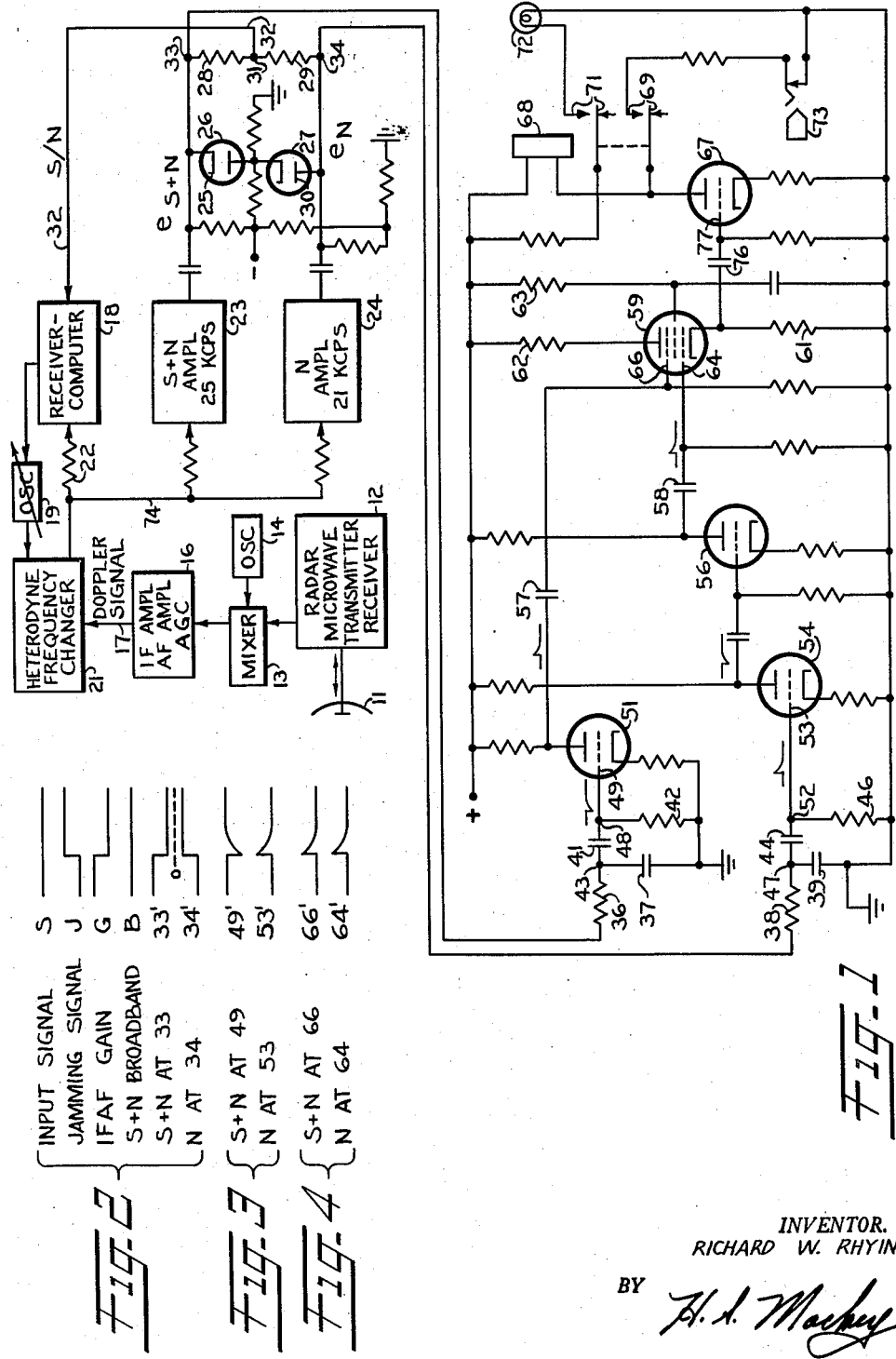

2,910,691

RADAR ANTI-JAMMING DEVICE

Richard W. Rhyins, Harrison, N.Y., assignor to General Precision Laboratory Incorporated, a corporation of New York Application November 5, 1954, Serial No. 467,131

12 Claims. (Cl. 343—7)

This invention relates to radar instruments and more specifically to airborne radar instruments containing circuits to protect them from malfunction caused by radio interference.

This invention is specifically for application to airborne radar instruments wherein the Doppler frequency component of the return or radar echo signal is employed in navigational instruments for ascertaining the ground speed, drift angle, rate of climb or dive, and other purposes.

The return or radar echo signal containing the Doppler information is generally a microwave radio frequency signal having a frequency somewhat higher or lower than that of the transmitted signal. When the transmitted signal or one representative thereof is multiplied by the echo signal a product is obtained having a frequency which is the difference of the multiplicand and multiplier frequencies and which contains the Doppler information. This product actually contains, like the radar echo signal, a band of frequencies having the characteristics of "noise" with a Gaussian distribution of frequencies. For example, in one particular speed-measuring radar instrument the difference band of frequencies or Doppler spectrum has a central frequency which may be anywhere in the range between 2,000 and 10,000 cycles per second and the spectrum has a bandwidth of 15% of its central frequency.

In order that such radar systems may be made fully automatic they must automatically track or follow changes in the quantity producing the Doppler information to produce an output signal continuously representing that quantity. Since the magnitude of the quantity is represented by the central frequency of the Doppler information, such radar systems include frequency trackers as one of their most important instrumentalities. This frequency tracker includes a search circuit which on initial operation continuously scans or searches the Doppler frequency band for a Doppler return signal. When the signal is found, the frequency tracker locks to it and thereafter stops scanning and follows the Doppler signal.

Due to the nature of the radar return spectrum and to the generally changing nature of the terrain which may be flown over, the intensity of the echo undergoes wide and rapid fluctuations. These fluctuations may often carry the echo intensity below its useful threshold value, which necessitates the use of a "memory" circuit to continue the functioning of the radar receiver-computer at the last known output during below-threshold periods. This memory circuit is switched by a circuit which measures the ratio of the input signal intensity to the constant intensity level of the noise background.

It is possible to cause such radar systems to malfunction by deliberately or inadvertently subjecting them to microwave radio radiation from an external transmitter. Such a jamming transmitter would obviously have to operate on the same microwave frequency as the radar system and would preferably be modulated at a frequency corresponding, at least momentarily, to the Doppler frequency to which the receiver-computer is receptive at the time. Another similar Doppler radar also might be capable of causing jamming. However, for deliberate jamming a specific type of transmitter as described below would be most effective and most other kinds of transmitters would be relatively ineffective.

In order to design effective protection against jamming in accordance with this invention, it is necessary to postulate the design of the jamming transmitter. Such a transmitter should have a carrier frequency equal to the radar carrier frequency. Since exact correspondence is very difficult to maintain at microwave frequencies, it is practically necessary to sweep the transmitter frequencies, that is, to frequency modulate the transmitter. In order to be effective the deviation of this modulation should be such as to sweep the transmitter over a frequency band somewhat wider than the radar intermediate frequency pass band, because this pass band constitutes the sharpest frequency discrimination encountered by a received radar signal. Likewise in order to cause serious interference with the radar operation the jamming transmitter frequency modulation must be at an audio or video rate which coincides with the audio or video frequency of the Doppler information being received by the radar instrument at the time. Thus the jamming frequency modulation must change in its modulating frequency over a range approximately that of the Doppler audio or video information. This frequency change may have a sawtooth form with a slope opposite to that of the radar scanning sawtooth. The jamming modulating frequency may then coincide with the Doppler frequency momentarily once in each cycle of the sawtooth jamming modulating form.

Such jamming may cause the radar system to malfunction by causing it to give a false output indication or no output indication. The false indication will be caused by impelling the radar receiver-computer to release its lock on the radar return signal and to lock to the jamming signal. Tests have shown that this will occur only when the jamming signal is relatively strong. By no output indication is meant that the radar system is shifted for an indefinitely long time to the memory mode of operation, thus depriving the radar system of the Doppler input data secured in normal operation. This latter type of malfunction will tend to occur only when the Doppler return is so weak that it is very near the operating threshold. The effect of the interference is then to suppress the Doppler return to below its threshold value and thus put the receiver-computer on memory. However, as the receiver-computer is not locked to the interfering signal, the change should be more or less temporary.

Due to the nature of the effect of interference during weak Doppler signals, it is considered that the radar system is sufficiently protected by its own signal-to-noise ratio (S/N) detection circuit. The operation of the instant anti-jamming device is therefore confined to the situation when the Doppler return S/N is at high level, that is, for example, S/N has a value between 10 and 45 db.

As a specific illustration, let it be assumed that the radar microwave central frequency, as transmitted, is 8,000 mc.p.s., and that the first principal bandpass limitation of the received signal is in the intermediate frequency amplifier, which has a central frequency of 30 mc.p.s. and a pass bandwith of 1 mc.p.s.

The jamming transmitter might then be constructed so that it can be tuned to a microwave frequency of 8,000 mc.p.s. It is frequency modulated with a deviation of ±2 mc.p.s. so that its frequency excursions are from 7,998 to 8,002 mc.p.s. It thus will sweep the IF pass band of 1 mc.p.s. even if off tune by 1½ m.c.p.s., and will partly sweep it if even further off tune. The rate of frequency modulation is made to vary downward from 12 to 1 kc.p.s., then to change abruptly to 12 kc.p.s. and repeat, the cycle taking 20 seconds. Thus the jamming transmitter while sweeping the IF pass band, subjects the radar instrument to an audio frequency varying over the complete Doppler audio frequency range. The jamming signal must therefore sweep the operating Doppler central frequency and be in synchronism with it at least once each 20-second cycle. If then the jamming signal is sufficiently strong, tests have shown that it will cause the radar instrument to leave the Doppler signal and lock to the jamming signal. At the end of the frequency spectrum, if the lock should be broken, the radar frequency tracker will commence scanning. But since the radar scanning direction and the jamming modulation sweep direction are opposite, the jamming signal will, during the ensuing cycle, again seize control of the radar.

The defense against jamming is based upon a difference in the outputs of the S/N detector under a jamming signal and under a strong radar signal. The S/N detector signal input is derived by heterodyne frequency conversion from the intermediate and audio amplifier output, which is highly gain-controlled by the intermediate frequency and audio frequency automatic gain control circuits. The S/N detector contains a fixed frequency channel having an output voltage representing the input signal strength plus the noise signal strength. The detector also contains a second channel operating at a second fixed frequency having an output voltage representing noise only. At high signal levels the voltage output of the noise channel is much less than that of the signal plus noise channel.

When a jamming signal is received during reception of a strong Doppler return signal, the automatic gain control reduces the gain and, although the jamming signal after mixing is within the intermediate frequency pass band, if its modulation is not at the exact audio frequency of the Doppler return, the sharply tuned signal plus noise channel will not perceive it and the voltage output of this channel will drop with the automatic gain control gain reduction. Similarly, if the intermediate frequency jamming signal has modulation which when heterodyned is not at the exact frequency of the sharply tuned noise detector channel, that channel will not perceive it and its voltage output also will drop with the automatic gain control gain reduction. That is, jamming causes a concurrent drop in the outputs of the signal plus noise and noise channels.

This jamming action is not duplicated by a sudden increase in the Doppler return intensity. Such an increase also reduces the amplifier gain, and consequently reduces the noise channel output. However, the output of the signal plus noise channel goes up, not down. This is so because the automatic gain control action maintains the wideband signal plus noise voltage constant at the input to the S/N detector. Since the noise portion of this signal is decreased by automatic gain control action throughout the wideband spectrum and at the output of the noise channel, the signal plus noise voltage sampled at the Gaussian center of the wideband signal plus noise spectrum by the sharply tuned signal plus noise channel must show a compensating increase. This increase may be shown to be proportional to the noise output decrease.

To recapitulate, an increased Doppler signal causes increased signal plus noise output with decreased noise output, but a jamming signal causes both signal plus noise and noise outputs to drop.

The present invention applies differentiating circuits to the outputs of the S/N detector circuit and by selectively polarized pulse circuits distinguishes between the two cases described above. The output is caused to operate an alarm when the radar is being jammed.

One purpose of this invention is to provide an arrangement for providing an indication when the operation of a radar instrument of the described class is being interfered with, or jammed by radio signals.

Another purpose of this invention is to provide an alarm indication when the operation of the radar instrument is deliberately interfered with by jamming its signals by the signals of a jamming transmitter.

A further understanding of this invention may be secured from the detailed description, in which:

Figure 1 is the schematic circuit of apparatus embodying the invention as applied to a Doppler radar instrument.

Figures 2, 3 and 4 graphically depict voltages at various points in the circuit.

Referring now to Fig. 1, a microwave radar instrument is partly represented by the antenna 11, microwave transmitter-receiver 12, mixer 13, stable oscillator 14, and intermediate and audio frequency amplifiers 16, these amplifiers being automatically gain controlled. The output at conductor 17 consists of an electrical potential having an audio spectrum of frequencies, and containing the Doppler frequency information. The character of this signal is that of noise having Gaussian distribution about a central frequency between 2,000 and 10,000 cycles, and having a spectrum width between half-power points of 15% of the central frequency.

A receiver-computer 18 finds the center of the Doppler spectrum and measures its frequency. In order to facilitate this operation the Doppler signal in conductor 17 is frequency-transformed by an adjustable oscillator 19 and heterodyning mixer-modulator 21 to a fixed higher frequency, 25 kc.p.s. being suitable. This mixer-modulator is wide band, so that when the central Doppler frequency is transformed to 25 kc.p.s. all energy at other frequencies within the wide Doppler spectrum, and including the entire constant noise background over the 2 to 10 kc.p.s. band, is transformed to frequencies above and below 25 kc.p.s. This new spectrum is applied through isolating resistor 22 to the receiver-computer 18. The latter controls the oscillator 19, by means well known to those skilled in this art, to maintain the transformed Doppler central frequency at exactly 25 kc.p.s., this operation constituting frequency tracking. In another mode of operation, when searching, the 25 kc.p.s. output of the heterodyne frequency changer 21 is caused to represent a Doppler input frequency continuously scanned across the band.

In order to detect and measure the signal-to-noise ratio of the signal applied to the receiver-computer an S/N ratio detector is provided. This detector consists of a signal-plus-noise amplifier 23 very sharply tuned to 25 kc.p.s., a noise amplifier 24 very sharply tuned to 21 kc.p.s., a demodulator comprising diodes 26 and 27, and equal subtracting resistors 28 and 29. The output potential at median terminal 31 represents the intensity of the Doppler signal above noise and therefore, since the noise intensity is considered constant, it also represents the value of the signal-to-noise ratio. This potential is applied through conductor 32 to the receiver-computer 18. When the S/N signal applied through conductor 32 drops to its threshold value the receiver-computer 18 changes to its memory mode of operation and commences scanning the Doppler frequency band.

The output terminals 33 and 34 of the signal plus noise and the noise channels of the S/N detector are suitable points to which to connect equipment for carrying out the purpose of this invention. At these points are found the output voltages of the two S/N detector channels, so that changes in these voltages represent changes in the signal-plus-noise and in noise, respectively. Since the cathode 25 of diode 26 is connected to terminal 33, the demodulated envelope of potential at that terminal is at a positive level. The anode 30 of diode 27 is connected to terminal 34, so that its signal level has an average negative potential. These polarities, or the reverse polarities, are suitable for the production of the normal S/N output signal at terminal 31. However, for the purposes of this invention no limitation is placed on the individual polarities of the diodes 26 or 27, or on the resulting direct current senses at the terminals 33 or 34, so long as the circuit arrangements remaining to be described are modified accordingly so that in the presence of jamming a selected combination of voltage change senses at terminals 33 and 34 results in the output signal of the anti-jamming device.

The two S/N detector output potential signals are first integrated to remove relatively high-frequency fluctuations inherent in Doppler-derived signals secured from terrain reflections. One integrating circuit consists of resistor 36 and capacitor 37 connected between terminal 33 and ground, and the other similar integrating circuit consists of resistor 38 and capacitor 39 connected between terminal 34 and ground. A suitable time constant for these circuits is 0.3 second.

The signals are next differentiated since the device operates on change of amplitude rather than on amplitude alone. Accordingly a differentiating circuit consisting of capacitor 41 and resistor 42 is connected between the median terminal 43 and ground, and another differentiating circuit consisting of capacitor 44 and resistor 46 is connected between terminal 47 and ground. A suitable time constant for these differentiating circuits is 3 seconds. These differentiating circuits are connected to high impedance loads, the terminal 48 being connected to the control grid 49 of a triode amplifier 51 and the terminal 52 being connected to the control grid 53 of a triode amplifier tube 54. Another triode amplifier tube 56 both amplifies and inverts the signal output of amplifier tube 54.

The outputs are taken from the anodes of amplifier tubes 51 and 56 and are applied through blocking capacitors 57 and 58 to a coincidence circuit comprising pentode 59. This tube is provided with cathode, anode and screen resistors 61, 62 and 63, and has inputs applied to the first grid 64 and third grid 66. This tube is of a type, such as 6AS6, which is controlled by third grid potentials nearly or quite as well as by first grid potentials. Output is taken from the cathode. The coincidence output after amplification in triode 67 is used to operate a relay having a coil 68 connected in the anode circuit of triode 67 and provided with locking contacts 69 and alarm contacts 71. The latter are connected to light a lamp 72 and the locking contacts 69 are connected in series with a restoring switch 73.

In the operation of this jamming alarm circuit, the normal outputs of demodulating diodes 26 and 27 consist of a fluctuating positive potential $e_{S+N}$ at terminal 33 representing at any instant the instantaneous value of signal plus noise, and a fluctuating negative potential $e_N$ at terminal 34 representing instantaneous noise. The instantaneous fluctuations are smoothed to a degree by the integrating circuits.

The strong Doppler return intermediate frequency input signal, when constant except for random high frequency fluctuations, is represented in Fig. 2 by the straight line S. If a jamming signal be applied it may be represented, at the input to the intermediate frequency amplifier, as a rising step function J. This increase of input intermediate frequency signal power, acting through the intermediate frequency and audio frequency automatic gain controls, reduces the amplifier gain as depicted by the graph G. The reduction in gain is such as to maintain the broadband signal plus noise signal constant at the input conductor 74, Fig. 1, of the S/N detector. However, assuming that the audio frequency of the jamming signal is not at the initial instant such as to be heterodyned to either 25 kc.p.s. or 21 kc.p.s., both of the S/N detector outputs will drop when the amplifier gain drops.

These drops are represented by a descending step graph 33', Fig. 2, since the positive voltage level at terminal 33, Fig. 1, is reduced, and by a rising step graph 34', Fig. 2, because the negative voltage level at terminal 34, Fig. 1, is brought nearer to zero. The dashed line 0 represents zero potential.

The step potentials 33' and 34', representing conditions at terminals 33 and 34, Fig. 1, are differentiated by the described differentiating circuits to produce at the control grids 49 and 53, Fig. 1, the pulses 49' and 53', Fig. 3. These pulses are amplified, and since the noise is on the order of 10% of the signal-plus-noise, the noise pulse is preferably amplified to a greater extent. Additionally one of the pulses must be inverted so that their polarities will be the same at the coincidence input. Consequently an odd number of amplification stages in the signal-plus-noise channel is indicated by the triode 51, Fig. 1, and an even number of stages in the noise channel is indicated by the triodes 54 and 56, so that the outputs consist of two positive pulses.

For proper operation of this circuit it is necessary that the coincidence circuit operate only on time-coincident pulses of a selected polarity and having more than a certain minimum threshold amplitude. The preferred coincidence circuit about to be described has such inherent characteristics. However, when some other coincident circuit having marginal characteristics is employed it may be preferable to clip and limit the input signals, either by biasing the amplifiers 51, 54 and 56 or by inserting clipping circuits, to obviate the possibility of operation of coincidence circuit operation on only one of the two input signals, or on input signals of wrong polarity.

The pulses resulting from the initiation of the jamming signal as applied to the third grid 66 and the first grid 64 of the coincidence pentode 59 are both positive as depicted by graphs 66' and 64' respectively, Fig. 4. The pentode 59 is so biased that in the absence of pulses no anode current flows and negative pulses, or a single positive pulse, likewise do not produce anode current flow. However, if two positive pulses be applied to the first and third grids in coincidence anode current flows for the duration of the coincidence of these pulses. This produces a potential drop in cathode resistor 61 and a positive pulse is derived therefrom. This positive pulse is coupled through capacitor 76 to the control grid 77 of the amplifier tube 67, resulting in operation of its anode relay coil 68. Upon relay closure contacts 69 apply locking potential to coil 68, locking the relay closed. Contacts 71 light lamp 72 which remains lit after the end of the pulse as a signal to the operator that a jamming signal has been perceived by the radar receiver. It will be noted that operation of the alarm lamp 72 is not dependent upon disturbance of proper operation of the radar instrument, but only upon the reception of a jamming signal which may or may not have been powerful enough to seize control of the receiver-computer.

The spring-loaded reset button 73, when pressed by the operator, opens the relay locking circuit, resetting the relay to its normal condition and restoring the alarm lamp 72 to its unlit condition.

Analysis of circuit operation for other input signal conditions shows that sudden increases or decreases of Doppler return signals, or sudden decreases in jamming signals, or gradual changes of any kind, will not operate the jamming alarm.

What is claimed is:

1. In a Doppler radar instrument containing a signal-to-noise ratio detector having two channel voltages, anti-jamming apparatus comprising, means differentiating said two channel voltages to form two single-pulse signals, coincidence means emitting an output signal only upon the time coincidence of said two single-pulse signals and only when the senses thereof are in selected directions, and means for utilizing said output signal indicating the presence of an extraneous signal being received by the radar instrument.

2. In a Doppler radar instrument containing a signal-to-noise ratio detector having two channel voltages, anti-jamming apparatus comprising, means for integrating said two channel voltages to form two output voltages containing reduced irregularities representing Doppler return terrain variations, means differentiating said two output voltages to form two single-pulse signals, coincidence means sensing the absolute sense of each of said two single-pulse signals and emitting an output signal upon the time coincidence of said two pulse signals of selected senses, and means utilizing said output signal indicating the presence of a jamming signal in the received input of said Doppler radar instrument.

3. In a Doppler radar instrument containing an automatic frequency tracker and a signal-to-noise ratio detector having two channel voltages, jamming alarm apparatus comprising, integrating means connected to said signal-to-noise detector to form from said two channel voltages two output voltages containing reduced Doppler return terrain variations, means differentiating said two output voltages to form two single-pulse signals of senses uniquely representing the onset of radio interference, a coincidence circuit identifying said senses representing interference and emitting an output signal upon said coincident identification, and alarm means actuated by said output signal indicating the presence of radio interference.

4. In a Doppler radar instrument containing an automatic frequency tracker and a signal-to-noise ratio detector having a signal-plus-noise channel and a noise channel, jamming alarm apparatus comprising, integrating means connected to said signal-plus-noise channel and said noise channel to form a signal-plus-noise output voltage and a noise output voltage both containing reduced Doppler return terrain variations, means differentiating said signal-plus-noise output voltage to form at the onset of a jamming interference signal a pulse having polarity representing reduction of the signal-plus-noise output voltage and differentiating said noise output voltage to form at the onset of a jamming interference signal a pulse having polarity representing reduction of the noise output voltage, a coincidence circuit identifying said pulse polarities occurring coincidentally only at the onset of a jamming interference signal, and alarm means actuated by the output of said coincidence circuit indicating the presence of jamming interference.

5. A radar anti-jamming device comprising, a signal-to-noise ratio detector having two channel voltages, means differentiating said two channel voltages to form two single-pulse signals representative of changes thereof, coincidence means emitting an output signal only upon the time coincidence of said two single-pulse signals and only when they have selected polarities, and means for utilizing said output signal to indicate the presence of an extraneous signal received by said radar.

6. A frequency-tracking Doppler radar instrument including an anti-jamming device comprising, a signal-to-noise ratio detector having two channel voltages, integrating means connected to said signal-to-noise detector to form from said two chanel voltages two output voltages containing reduced Doppler return terrain variations, means for differentiating said two output voltages to form two single-pulse signals having senses uniquely representing the onset of radio interference, a coincidence circuit identifying said senses representing interference and emitting an output signal upon said coincident identification and alarm means actuated by said output signal indicating the presence of radio interference.

7. A Doppler frequency-tracking radar instrument comprising, a signal-to-noise ratio detector having a signal-plus-noise channel and a noise channel, integrating means connected to said signal-plus-noise channel and said noise channel to form a signal-plus-noise output voltage and a noise output voltage both containing reduced Doppler return terrain variations, means differentiating said signal-plus-noise output voltage to form at the onset of a jamming interference signal a pulse having polarity representing reduction of signal-plus-noise output voltage and differentiating said noise output voltage to form at the onset of a jamming interference signal a pulse having polarity representing reduction of the noise output voltage, a coincidence circuit identifying said pulse polarities occurring coincidentally only at the onset of a jamming interference signal, and alarm means actuated by the output of said coincidence circuit indicating the presence of jamming interference.

8. A Doppler frequency-tracking radar instrument providing a jamming alarm comprising, a signal-to-noise ratio detector having a signal-plus-noise channel and a noise channel, integrating means connected to said signal-plus-noise channel and said noise channel to smooth the voltages thereof reducing Doppler return terrain variations, means differentiating said smoothed signal-plus-noise voltage to form a signal plus noise pulse at the onset of jamming interference signal having a selected first polarity representing reduction of signal-plus-noise voltage magnitude, means differentiating said smoothed noise voltage to form a noise pulse at the onset of a jamming interference signal having a selected second polarity representing reduction of noise voltage magnitude, a coincidence circuit connected for operation by said several differentiating means only upon the coincident occurrence of two pulses of said selected first and second polarities, and alarm means actuated by the output of said coincidence circuit indicating the presence of jamming interference.

9. A Doppler frequency-tracking radar in accordance with claim 8 in which amplifiers and inverters are interposed between said differentiating means and said coincidence circuit to bring said signal-plus-noise and noise pulse signals to substantially the same amplitude and to the same polarity.

10. A Doppler radar jamming control comprising, a wide band amplifier provided with automatic gain control means having a signal representative of a reflected Doppler shift echo signal impressed thereon and having an output whose amplitude is controlled in accordance with the amplitude of signal and noise frequency energy occurring within the band of frequencies passed by said amplifier, wide band frequency changing means having the output of said wide band amplifier impressed thereon for transforming the center frequency of the Doppler shift echo signal to a fixed selected frequency and having an output which includes said fixed selected frequency and a wide band of signal frequencies above and below said selected frequency, a sharply tuned signal plus noise amplifier tuned to said selected frequency connected to the output of said frequency changing means and transmitting only that portion of the output thereof having signal frequencies at said selected frequency, a sharply tuned noise amplifier connected to the output of said frequency changing means tuned to a frequency which differs from said selected frequency connected to the output of said frequency changing means and transmitting only that portion of the output thereof having signal frequencies at the tuned frequency of said noise amplifier, means connected to the output of said signal plus noise amplifier for producing a signal pulse by the abrupt change in amplitude thereof, means connected to the output of said noise amplifier for producing a signal pulse by the abrupt change in amplitude thereof, and indicator means operated only by the simultaneous occurrence of said first and second mentioned signal pulses of selected polarities.

11. A Doppler radar jamming control comprising, a wide band amplifier provided with automatic gain control means having a signal representative of a reflected Doppler shift echo signal impressed thereon and having an output whose amplitude is controlled in accordance with the amplitude of signal and noise frequency energy occurring within the band of frequencies passed by said amplifier, a wide band mixer having the output of said amplifier impressed thereon, an oscillator having its output impressed on said mixer, means for controlling the frequency of said oscillator in accordance with the center frequency of the output of said mixer whereby the center frequency of the wide band output thereof is maintained at a selected frequency, a sharply tuned signal plus noise amplifier tuned to the center frequency of said mixer connected to the output thereof and transmitting signals only at said center frequency, a sharply tuned noise amplifier tuned to a frequency which departs from the center frequency of said mixer connected to the output thereof and transmitting signals only at said departure frequency, means connected to the output of said signal plus noise amplifier for producing a first pulse signal on the occurrence of a change in output amplitude, means connected to the output of said noise amplifier for producing a second pulse signal on the occurrence of a change in output amplitude, and means operated only by the simultaneous occurrence of first and second pulse signals of selected polarities.

12. A Doppler radar jamming control comprising, a wide band amplifier provided with automatic gain control means having a signal representative of a reflected Doppler shift echo signal impressed thereon and having an output whose amplitude is controlled in accordance with the amplitude of signal and noise frequency energy occurring within the band of frequencies passed by said amplifier, automatically controlled wide band frequency changing means the output of which is a wide band of signal frequencies centered about a selected fixed frequency having the output of said wide band amplifier impressed thereon, a sharply tuned signal plus noise amplifier tuned to said selected frequency connected to the output of said frequency changing means and transmitting signals only at said selected frequency, a sharply tuned noise amplifier tuned to a frequency which departs from said selected frequency connected to the output of said frequency changing means and transmitting signals only at said departure frequency, differentiating means connected to the output of said signal plus noise amplifier producing therefrom a first pulse signal on the occurrence of a change in output amplitude thereof, differentiating means connected to the output of said noise amplifier producing therefrom a second pulse signal on the occurrence of a change in output amplitude thereof, and means operated by the simultaneous occurrence of first and second pulse signals of selected polarities.

References Cited in the file of this patent

UNITED STATES PATENTS 2,586,605    Blumlein _____ Feb. 19, 1952